US008141860B2

(12) United States Patent
Goldman

(10) Patent No.: US 8,141,860 B2
(45) Date of Patent: Mar. 27, 2012

(54) FOLDABLE CUTTING BOARD

(76) Inventor: Robert Ivan Goldman, San Diego, CA (US)

(*) Notice: Subject to any disclaimer, the term of this patent is extended or adjusted under 35 U.S.C. 154(b) by 575 days.

(21) Appl. No.: 12/161,398

(22) PCT Filed: Jan. 19, 2007

(86) PCT No.: PCT/US2007/001538
§ 371 (c)(1),
(2), (4) Date: Jul. 18, 2008

(87) PCT Pub. No.: WO2007/084723
PCT Pub. Date: Jul. 26, 2007

(65) Prior Publication Data
US 2009/0085270 A1 Apr. 2, 2009

(51) Int. Cl.
B23Q 3/00 (2006.01)
(52) U.S. Cl. ............ 269/303; 269/289 R; 269/285; 269/286; 269/302.1; 269/900
(58) Field of Classification Search .......... 269/289 R, 269/285, 286, 302.1, 303, 900
See application file for complete search history.

(56) References Cited

U.S. PATENT DOCUMENTS

| 120,394 | A | * | 10/1871 | Petterson | 269/302.1 |
|---|---|---|---|---|---|
| 3,505,031 | A | * | 4/1970 | Perkinson et al. | 422/547 |
| 4,065,115 | A | * | 12/1977 | Popeil et al. | 269/16 |
| D248,078 | S | * | 6/1978 | Warnekros | D7/543 |
| 4,102,468 | A | * | 7/1978 | Goldman | 220/630 |
| 4,273,318 | A | * | 6/1981 | Crowhurst | 269/13 |
| D261,904 | S | * | 11/1981 | Polhemus | D19/92 |
| D262,507 | S | * | 1/1982 | Wooldridge | D7/698 |
| D265,537 | S | * | 7/1982 | Stockdale | D7/698 |
| 4,447,051 | A | * | 5/1984 | Price | 269/302.1 |
| D315,084 | S | * | 3/1991 | Sata | D7/698 |
| 5,203,548 | A | * | 4/1993 | Sanders | 269/302.1 |
| 5,472,790 | A | * | 12/1995 | Thompson | 428/500 |
| 5,527,022 | A | * | 6/1996 | Gibson | 269/13 |
| 5,580,037 | A | * | 12/1996 | Gore | 269/54.5 |
| 5,626,067 | A | * | 5/1997 | Lothe | 83/761 |
| 6,148,881 | A | * | 11/2000 | Valenzuela | 144/286.1 |
| 6,164,478 | A | * | 12/2000 | Cant | 220/62.1 |
| 6,360,798 | B1 | * | 3/2002 | Apolinski | 144/286.5 |
| 6,422,551 | B1 | * | 7/2002 | Brotz | 269/289 R |
| 6,789,792 | B1 | * | 9/2004 | Angland | 269/289 R |
| 6,994,335 | B2 | * | 2/2006 | Porchia et al. | 269/302.1 |
| 2002/0043296 | A1 | * | 4/2002 | Daniels et al. | 144/286.5 |
| 2003/0097915 | A1 | * | 5/2003 | Chen et al. | 83/13 |
| 2007/0007705 | A1 | * | 1/2007 | Chen | 269/289 R |

* cited by examiner

Primary Examiner — George Nguyen
(74) Attorney, Agent, or Firm — Charmasson, Buchaca & Leach, LLP

(57) ABSTRACT

A versatile, foldable and disposable cutting board (1) for preparing food is made of a thin, resiliently flexible sheet of propylene, stainless steel or other cut-resistant material. The board has a triangular section (11) projecting away from the user to form a distal pouring funnel and spout when the board is folded along its middle by grabbing both sides (4) and moving them toward each other. A narrow fence (6) extending upwardly from the periphery of the board converges at the apex (9) of the triangular section. A rigidizing flange (15) extends outwardly from the upper rim of the fence but is interrupted (16) near the apex. The fence is interrupted along an offset portion (20) of the proximal edge (2) in order to provide clearance for the blade and handle of a chopping or mincing instrument.

10 Claims, 3 Drawing Sheets

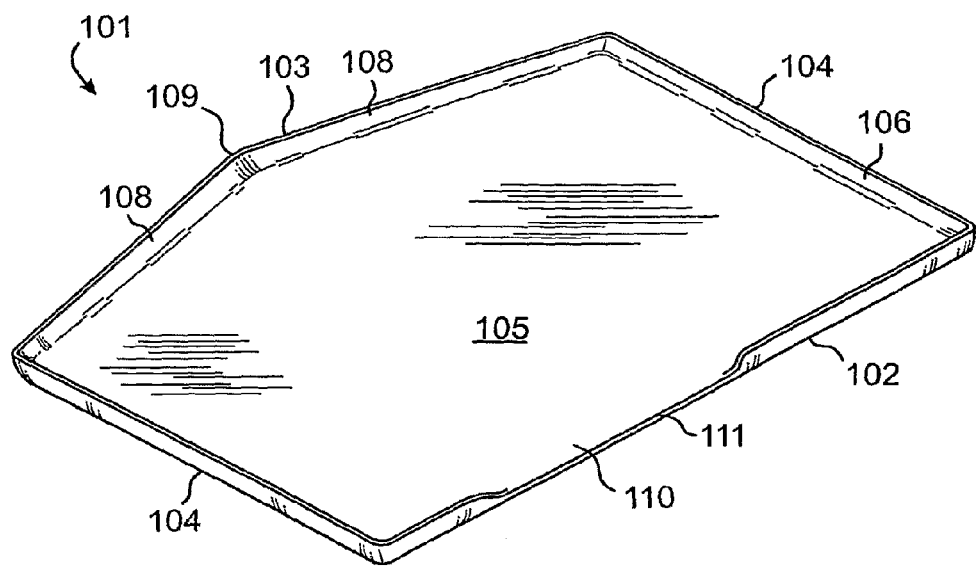
FIG. 7
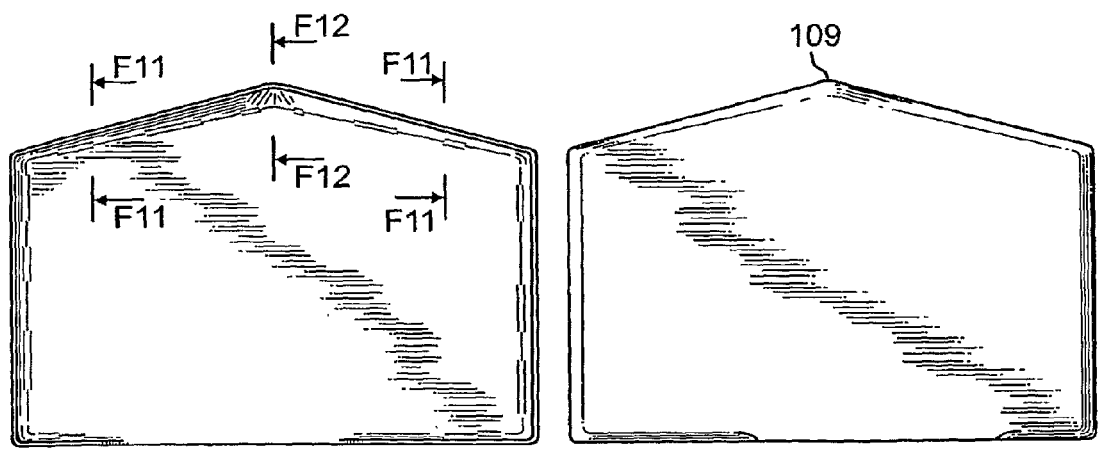
FIG. 8
FIG. 9
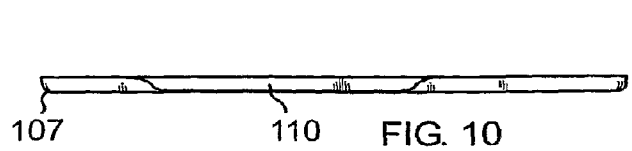
FIG. 10
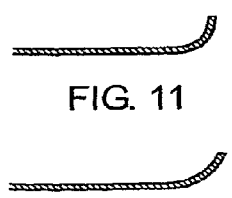
FIG. 11
FIG. 12

FOLDABLE CUTTING BOARD

FIELD OF THE INVENTION

This invention relates to support structures for cutting or chopping material, and more specifically to cutting boards used in food preparation.

BACKGROUND

A number of foldable and disposable kitchen cutting boards found in the prior art can be manipulated to form a convenient funneling and pouring structure to a evacuate liquid or dump the processed food into a cooking pan.

Typical of such prior devices is the one disclosed in U.S. Pat. No. 6,164,478 Cant. Although the disclosed structure can adequately perform the funneling and pouring functions, its complexity makes it relatively difficult and expensive to manufacture. The forming of the folding sides, the score lines and fold lines that cause the formation of the pouring tip may require several molding or stamping steps. Moreover, in some devices the folds or creases can be unsightly, and trap foodstuffs making them difficult to clean, or result in some lingering deformation of the board. Further, the presence of the fence on the proximal side of the board may interfere with the manipulation of a knife or cleaver when cutting or chopping foodstuffs, or the scraping of cut foodstuffs off of the board. Consequently, there is a need for a simpler, yet efficient and disposable cutting board that fulfills all the functions offered by the prior art, yet can be manufactured by a one step molding or stamping process.

SUMMARY

A versatile, foldable and disposable kitchen cutting board is formed in a single-step stamping or molding of a sheet of resiliently flexible material such steel, propylene, polyurthane, polycarbonate or other cut-resisting plastic. The cutting board has a triangular section whose sides are defined by the distal edge of the board - the one away from its user. A narrow fence extends in a substantially vertical direction from the edges of the board and a stiffening flange extends outwardly from the fence. The apex of the triangular section and of the fence is not sharp but is rounded and does not include any crease or folding line. Accordingly, when the board is folded along a front to back median section by grabbing both sides and moving them upwardly toward each other, the apical portion of the fence forms a temporary convenient pouring spout.

In some embodiments, the portion of the fence that extends along the distal edge is slanted outwardly to dip gradually toward the apex of the triangular section where the fence is in a substantially oblique orientation to help form the temporary spout when the board is folded.

In a portion of the proximal edge of the board, the fence has reduced height in order to provide clearance for the manipulation of a cutting tool. The height can be the entire height of the fence thereby forming an interruption in the fence. The lowered or reduced height part of the fence is preferably offset from the center of the board in order to accommodate either a right hand or left hand handling of a cutting tool.

In some embodiments there is provided a cutting board which comprises a planar work area having a proximal edge, two lateral edges and a distal edge; said work area comprising a substantially quadrangular section limited on three sides by said proximal and lateral edges, and a triangular section having a base congruently adjacent to said quadrangular section and an apex at the convergence of two portions of said distal edge; and, a narrow fence extending upwardly from said work area along said edges and having a reduced height portion along said proximal edge.

In some embodiments said triangular section has equal sides; whereby lifting and moving said lateral edges toward each other causes said cutting board to fold along a median line passing through said apex. In some embodiments the cutting board further comprises an inwardly concavely rounded junction between said fence and work area. In some embodiments said reduced height portion is offset from the center of said board. In some embodiments said fence comprises an outwardly extending upper flange. In some embodiments said flange is interrupted about said apex. In some embodiments said fence further comprises a rounded apical portion without any fold line. In some embodiments said flange comprises a downward ledge projecting peripherally from said flange. In some embodiments the cutting board further comprises a skirt projecting outwardly from said ledge.

In some embodiments said fence has a part gradually dipping obliquely and outwardly from both lateral ends of said distal edge toward a median section to a substantially oblique position. In some embodiments said part has a substantially constant width and an absence of a cutout portion about said median section.

In some embodiments the cutting board is formed entirely out of a resiliently pliable sheet of cut-resistant material. In some embodiments said material is taken from a group substantially consisting of polypropylene, polyurethane, acrylic, polycarbonate and steel.

In some embodiments said part further comprises an oblique, rounded apex without any fold line.

In some embodiments there is provided a cutting board which comprises: a planar, central work area having a proximal edge, two lateral edges and a distal edge; a narrow fence extending upwardly at the periphery of said work area, said fence having a part gradually dipping obliquely and outwardly from both lateral ends of said distal edge toward a median section into a substantially oblique position; and whereby said median section forms a pouring spout when said board is folded by lifting and moving said lateral edges toward each other.

In some embodiments said work area comprises a substantially triangular section having sides defined by said distal edge. In some embodiments said fence is interrupted along a portion of said proximal edge. In some embodiments said fence has a reduced height along a portion of said proximal edge. In some embodiments said reduced height portion is offset from the center of said board. In some embodiments said fence has a reduced height along an offset portion of said proximal edge. In some embodiments said part has a substantially constant width and an absence of cutout portion about said median section. In some embodiments the board is formed entirely out of a resiliently pliable sheet of cut-resistant material. In some embodiments said material is taken from a group substantially consisting of polypropylene, polyurethane, acrylic, polycarbonate and steel. In some embodiments said part further comprises an oblique, rounded apex without any fold line. In some embodiments said area has a shape selected from the group consisting of polygons, circles, ovals, ellipses, teardrop shapes and combinations thereof.

BRIEF DESCRIPTION OF THE DRAWINGS

FIG. 7 is a perspective view of a disposable cutting board according to a second alternate embodiment.

FIG. 8 is a top plan view thereof.

FIG. 9 is a bottom plan view thereof.

FIG. 10 is a front elevational view thereof.

FIGS. 11 and 12 are partial cross-sectional views of the fence taken along lines F11-F11 and F12-F12 respectively of FIG. 8.

DESCRIPTION OF THE EXEMPLARY EMBODIMENTS

Figure 1:
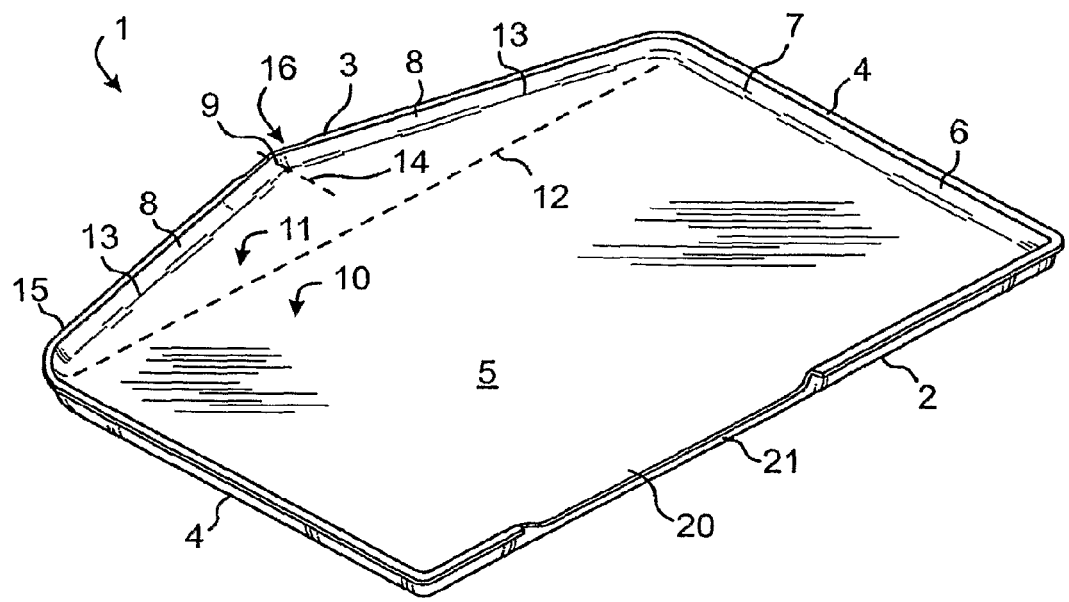
FIG. 1 is a perspective view of a disposable cutting board according to a first embodiment.
Figure 2:
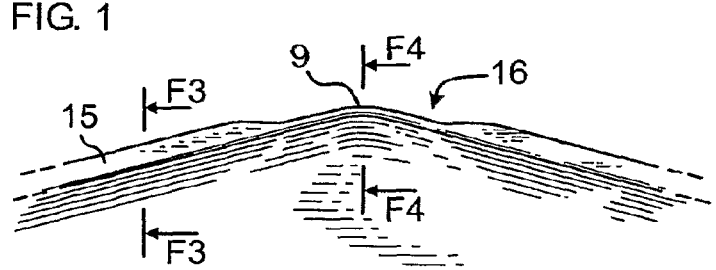
FIG. 2 is a partial top plan view of the apical section of the cutting board of FIG. 1.
Figure 3:
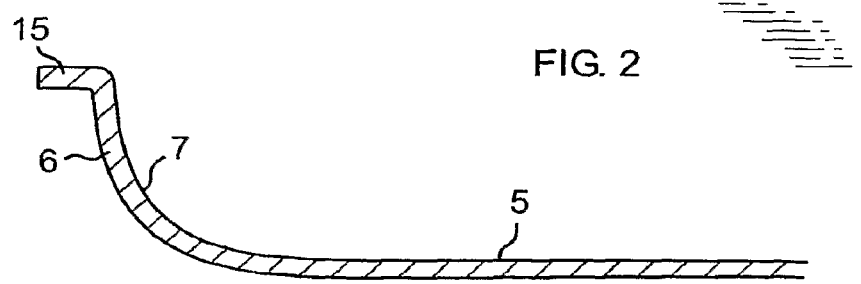
FIGS. 3 and 4 are partial cross-sectional views of the fence taken along lines F3-F3 and F4-F4 respectively of FIG. 2.
Figure 4:
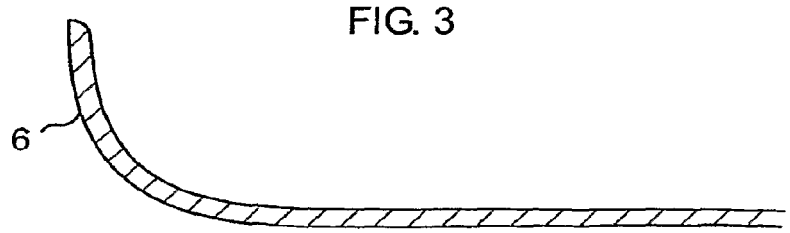

Referring now to the drawing there is shown in FIGS. 1-4, a substantially planar kitchen cutting board 1 preferably molded or stamped out of a sheet of resiliently flexible material, preferably polypropylene or other cut-resisting material such as stainless steel, polyurethane, acrylic, or polycarbonate plastic. The board has a working area 5 with a substantially planar surface having a proximal edge 2 to be held closest to the user, and substantially parallel lateral edges 4, distal edge 3 pointing away from the user. The working area includes a substantially quadrangular section 10 limited on three sides by the proximal edge 2 and the lateral edges 4, and a substantially triangular section 11 having a base 12 congruently adjacent to the quadrangular section 10 and two substantially equal sides 13. The distal edge 3 has two portions 8 which converge toward an apex 9 at a median section of the board. By lifting and moving the lateral edges toward each other a resiliently temporary fold forms along a median line 14 passing through the apex 9 to create a temporary pouring spout.

A narrow fence 6 extends upwardly from a periphery of the work area 5 along the edges. The purpose of the fence is to prevent liquid and parcels of the material being cut or chopped from escaping the board. The inwardly concave junction 7 of the fence and the planar surface is not sharp but preferably rounded to simplify its fabrication and to ease the cleaning of the board. No folds or creases are made in the junction.

Along the proximal edge 2 of the cutting board, the fence 6 is interrupted along a substantial portion 20 to have a reduced height. In some embodiments, the reduced height portion 20 is dimensioned to leave a small ledge 21 sufficient to retain on the cutting board, liquids or small debris. In other embodiments the reduced height portion extends to the planar surface of the working area. The purpose of the reduced height portion is to facilitate scraping debris off the ledge of the board while the board is supported on a flat surface and to provide additional clearance for the blade, handle or user's hand during the manipulation of a knife or cleaver. The interrupted reduced height portion of the fence 20 is preferably laterally offset slightly from the center of the board in order to accommodate the right or left hand holding of the cutting tool.

The fence has an outwardly extending upper flange 15 which provides structural reinforcement to the fence and also provides convenient grasping points on the lateral edges. The flange is substantially parallel with the planar working area 5 when the board is laid flat. The flange 15 is interrupted 16 about the apex 9 to facilitate the folding deformation of the distal edge 3 into the temporary spout.

No folding line or crease is formed in the median section of the board or in the spout-forming apical section of the fence. Instead, the apex is rounded and further does not feature any cutout portion to guide and limit the flow of material off the cutting board as can be found in devices of the prior art. Instead, the rounded apical portion of the tilted fence assumes a smooth, channel-like configuration when the cutting board is partially folded. The interruption of the upper flange merely facilitates the temporary deformation of the apical section. When the board is again laid flat, the temporary spout disappears and the fence returns to a nominal, substantially flat shape. Without a fold line or crease, food is less likely to be trapped and cleaning is made easier.

In this exemplary embodiment of the invention, the width of the board is approximately 46 centimeters (18 inches); the sides have a length of about 28 centimeters (11 inches) and the front to back distance at the apex is about 30 centimeters (12 inches). The width of the fence is a constant 1.2 centimeters (about 0.5 inch). It shall be noted that although this exemplary embodiment shows a board having a roughly pentagonal shape having substantially straight sides, the features described above can be used on boards having other shapes including polygons, ovals, ellipses, teardrop shapes and combinations thereof to name a few, and where the edges can be formed onto straight sides or curved sides.

Figure 5:
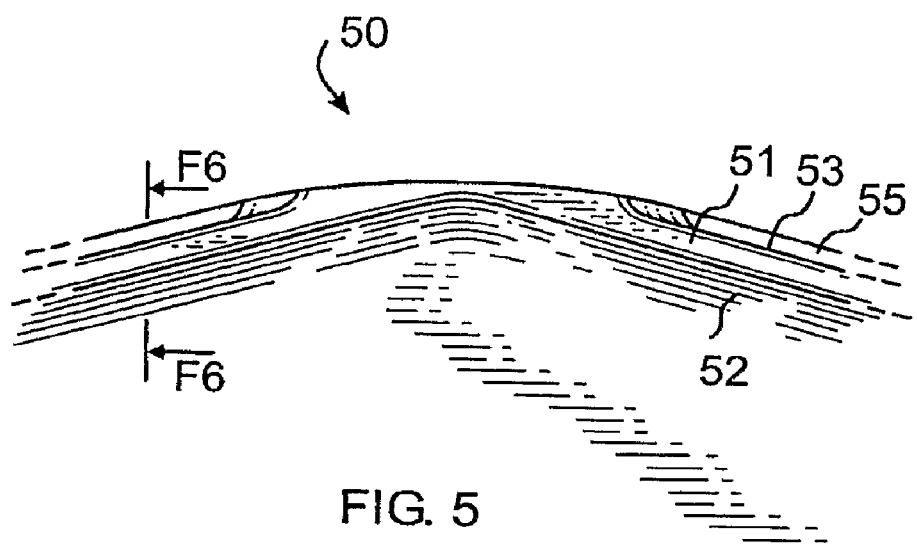
FIG. 5 is a partial top plan view of the apical section of a disposable cutting board according to a first alternate embodiment.
Figure 6:
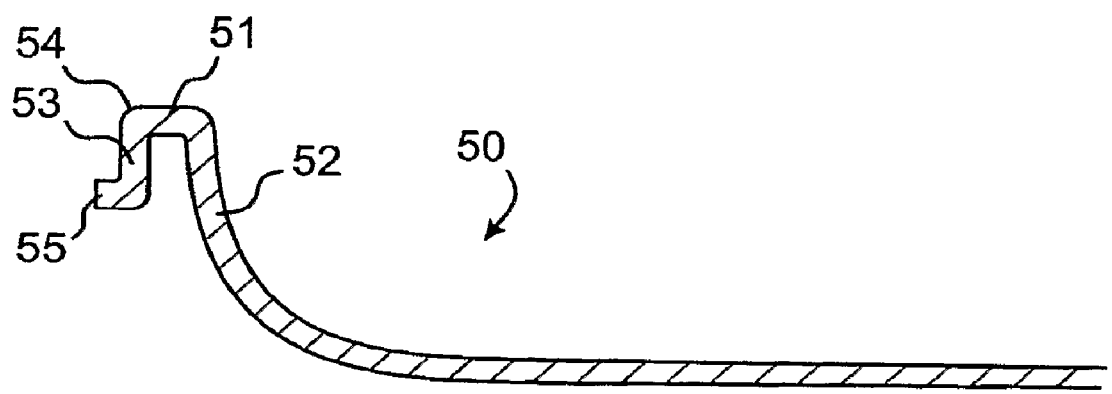
FIG. 6 is partial cross-sectional views of the fence taken along line F6-F6 of FIG. 5.

Referring now to FIGS. 5-6 there is shown the apical section of a first alternate embodiment of a kitchen cutting board 50 wherein the upper flange 51 has been further adapted to provide even greater structural rigidity to the fence 52 so that the board can be made from a thinner sheet of resilient material and thereby reduce the amount of material required and thereby reduce weight. A ledge 53 projects downwardly from the outer periphery 54 of the flange 51. In addition a skirt 55 projects outwardly from the ledge 53 substantially parallel to the flange 51. Around the apical section there is an interruption in the ledge, skirt, and flange in order to facilitate the temporary folding of the board to form the temporary spout.

Referring now to FIGS. 7-12 there is shown an alternate embodiment of a substantially planar kitchen cutting board 101 preferably molded or stamped out of a sheet of resiliently flexible material, preferably polypropylene or other cut-resisting material such as stainless steel, polyurethane, acrylic, or polycarbonate plastic. The board has a proximal edge 102 to be held closest to the user, a triangular distal edge 103 pointing away from the user, substantially parallel lateral edges 104, and a working area 105 with a planar surface. A narrow fence 106 extends upwardly from a periphery of the board. The junction of the fence and board edges 107 is not sharp but preferably rounded to simplify its fabrication and to ease the cleaning of the board.

A part 108 of the fence which extends from the triangular distal edge gradually dips outwardly and obliquely from the lateral edges toward a median section at the apex 109. Consequently, at the apex, the fence reaches an approximately 130 to 150 degree oblique position as illustrated in FIG. 6. No folding line or crease is formed in the median section of the board or in the spout-forming apex of the fence. Instead, the apex is rounded and further does not feature any cutout portion to guide and limit the flow of material off the cutting board as can be found in devices of the prior art. Instead, the rounded apical portion of the tilted fence assumes a smooth, channel-like configuration when the cutting board is partially folded.

Along the proximal edge 102 of the cutting board, the fence 106 is interrupted along a substantial portion 110 in order to provide clearance for the blade, handle or user's hand during the manipulation of a knife or cleaver. In some embodiments, the clearance portion 110 has a reduced height leaving a small ledge 111 sufficient to retain on the cutting board, liquids or small debris. In other embodiments the clearance portion extends to the planar surface of the working are to facilitate scraping debris off the ledge of the board while the board is supported on a flat surface. The interrupted clearance portion of the fence 110 is preferably offset slightly from the median portion of the cutting area 105 of the board in order to accommodate the right or left hand holding of the cutting tool.

While the preferred embodiment of the invention has been described, modifications can be made and other embodiments may be devised without departing from the spirit of the invention and the scope of the appended claims.

What is claimed is:

1. A cutting board which comprises:
    a planar work area having a proximal edge, two lateral edges and a distal edge;
    said work area comprising a substantially quadrangular section limited on three sides by said proximal and lateral edges, and a triangular section having a base congruently adjacent to said quadrangular section and an apex at the convergence of two portions of said distal edge; and,
    a narrow fence extending upwardly from said work area along said edges and having a reduced height portion along said proximal edge;
    an inwardly concavely rounded junction between said fence and work area;
    wherein said fence comprises an outwardly extending upper flange;
    wherein said flange is interrupted about said apex; and
    wherein said board is formed entirely out of a resiliently pliable sheet of cut-resistant material.

2. The cutting board of claim 1, wherein said triangular section has equal sides; whereby lifting and moving said lateral edges toward each other causes said cutting board to fold along a median line passing through said apex.

3. The cutting board of claim 1, wherein said reduced height portion is offset from the center of said board.

4. The cutting board of claim 1, wherein said fence further comprises a rounded apical portion without any fold line.

5. The cutting board of claim 1, wherein said flange comprises a downward ledge projecting peripherally from said flange.

6. The cutting board of claim 5, which further comprises a skirt projecting outwardly from said ledge.

7. The cutting board of claim 1, wherein said fence has a part gradually dipping obliquely and outwardly from both lateral ends of said distal edge toward a median section to a substantially oblique position.

8. The cutting board of claim 7, wherein said part has a substantially constant width and an absence of a cutout portion about said median section.

9. The cutting board of claim 1, wherein said material is taken from a group substantially consisting of polypropylene, polyurethane, acrylic, polycarbonate and steel.

10. The cutting board of claim 7, wherein said part further comprises an oblique, rounded apex without any fold line.

* * * * *